June 30, 1959 F. E. PAYNE 2,892,642
ROTARY MECHANICAL SEAL
Filed Aug. 18, 1955 2 Sheets-Sheet 1

INVENTOR:
FRANK E. PAYNE
BY
Edward R. Sounder

June 30, 1959     F. E. PAYNE     2,892,642
ROTARY MECHANICAL SEAL
Filed Aug. 18, 1955     2 Sheets-Sheet 2

INVENTOR:
FRANK E. PAYNE
BY
Edward R. Sounder

United States Patent Office 2,892,642
Patented June 30, 1959

---

2,892,642

ROTARY MECHANICAL SEAL

Frank E. Payne, Glencoe, Ill., assignor to Crane Packing Company, Chicago, Ill., a corporation of Illinois Application August 18, 1955, Serial No. 529,223

5 Claims. (Cl. 286—11)

The present invention relates to rotary mechanical seals designed for use in effecting a seal against the escape of fluid between relatively rotatable machine parts, as for example, a pump or other machine casing and a rotatable shaft which extends through an opening provided in such a casing.

Seals of the character disclosed herein, in general, include a sealing washer adapted to encircle the shaft to be sealed and having an annular sealing face designed for running sealing engagement with a similar running sealing surface provided on a cooperating seat, the two running sealing surfaces extending in a radial direction normal to the shaft. Such seals are commonly referred to as end-face seals and many seals of this character employ an elongated axially extending tubular diaphragm of resilient fluid-impervious material sealingly connected at one end to the washer and at its other end to the casing through which the shaft extends. It is to this latter type of end-face diaphragm type seal that the present invention specifically relates.

It is among the principal objects of the present invention to provide an improved diaphragm type end-face seal assembly in which the diaphragm employed is of improved design which renders the same readily flexible in an axial direction to accommodate relative axial movement between the sealing washer and the shaft which it encircles, such relative motion existing by virtue either of wear on the seal surfaces or by virtue of radial misalignment of the seal surfaces which tends to impart a reciprocal motion to the sealing washer as the same rotates against the misaligned seal seat.

Heretofore many end-face seals of the flexible diaphragm type have failed to give good service in that the diaphragm does not possess sufficient flexiblity to enable relative movement between the washer and shaft to take place. In some instances a thrust is exerted upon the diaphragm which extends through the complete thickness of the rubber lengthwise or in an axial direction so that the bellows goes "solid" so to speak, and resists the flexing action of the usual spring which urges the washer forwardly against the seat. This phenomenon tends to cause the seal surfaces to run hot thereby burning out the seal. The present invention is designed to overcome this above noted limitation and toward this end it is a further object of the invention to provide an end-face seal of the flexible diaphragm type in which there can be no axial thrust on the flexible diaphragm through its entire length thus allowing the diaphragm to readily follow the movements of the washer without interfering with the free traverse movement thereof.

Another limitation that is attendant upon the use of conventional end-face diaphragm seals resides in the fact that the diaphragm when subject to fluid pressures has a tendency to become distorted in such a manner that the edges of the diaphragm tend to creep from between the clamping members which hold the same in position either on the washer or against the casing with which it is in sealing engagement. This creepage is the result of buckling of the diaphragm and it usually results in leakage of fluid at the points of creepage. It is therefore a still further object of the invention to provide an end-face seal having a diaphragm associated therewith which is provided with a definite region of flexibility which is extremely sensitive and which, in actual operation, relieves the ends or edges of the diaphragm from stress and the consequent strain which would tend to pull the same from between the members which are employed for clamping the diaphragm in position.

Yet another object of the invention is to provide an end-face seal of the type briefly outlined above in which the reverse bend provided in the diaphragm is of such a nature that it permits a rolling action of the diaphragm, this action taking place in an axial direction and with the reverse bend extending between the outer cylindrical surface of the washer and the inner cylindrical surface of the opening in the casing surrounding the washer so that a very short overall seal structure may be attained while at the same time accommodating relatively large axial displacement or reciprocal movements of the washer.

Other objects and advantages of the invention, not at this time enumerated, will become more readily apparent as the nature of the present invention is better understood.

In the accompanying two sheets of drawings forming a part of this specification, several embodiments of the invention have been shown.

Figure 1:
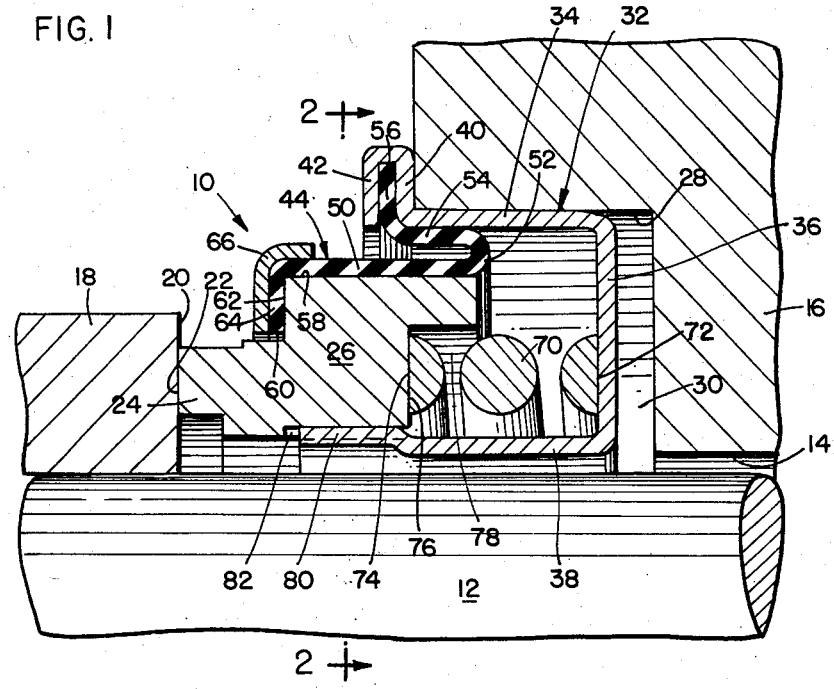
Fig. 1 is a fragmentary sectional view taken substantially radially through one form of rotary mechanical seal constructed in accordance with the principles of the present invention and showing the same operatively applied between two relatively rotatable elements.
Figure 2:
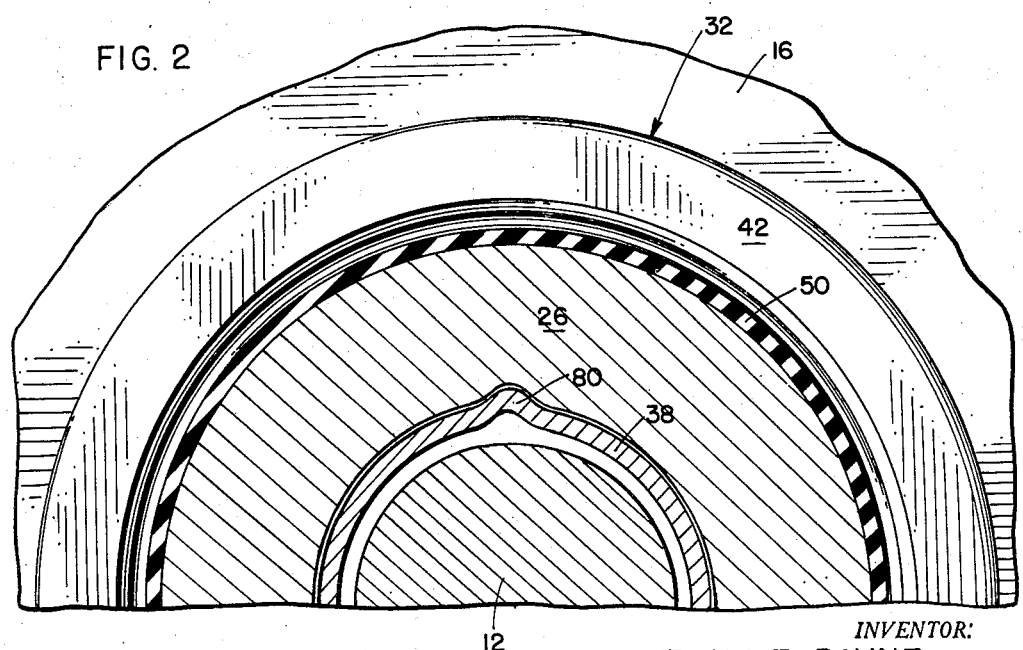
Fig. 2 is a sectional view taken substantially along the line 2—2 of Fig. 1.

Referring now to the drawings in detail and in particular to Figs. 1 and 2 wherein one form of the present rotary mechanical seal has been shown, the seal assembly is designated in its entirely at 10 and is designed for use on a shaft 12 for sealing the latter against leakage along the shaft, as for example, through an opening 14 provided in a member 16 through which the shaft extends. Purely for illustrative purposes the wall 16 has been shown as comprising a pump casing in which an impeller 18 which turns with the shaft 12 is rotatably mounted. It will be understood, however, that the member 16 might conceivably comprise the wall portion of a structure which is mounted for rotation on the shaft 12 and irrespective of the particular installation within which the seal assembly 10 is applied or of the use to which it is put, the essential features of the invention are always preserved.

The impeller 18 is formed with a substantially flat radially disposed surface 20 which constitutes a seal seat and the surface 20 is designed for running sealing engagement with a similar flat radially extending sealing surface 22 provided on the forwardly extending nose piece 24 of a sealing washer 26, the latter forming an element of the improved seal assembly 10. In installations other than the illustrated pump structure it will be understood that the seal seat 20 may be formed as a radial shoulder on the shaft 12 or it may be formed as a separate collar or gland sealingly secured to the shaft 12.

The opening 14 in the casing 16 is provided with an enlarged counterbore 28 establishing a recess 30 designed for reception therein of a seal retainer 32 which is preferably made of a noncorrodable material such as brass, stainless steel or the like. The retainer is generally of cup-shaped configuration and includes an outer cylindrical wall 34 which fits within the recess 30 by means of a pressed fit in order to establish a seal with the wall of the counterbore 28. The retainer further includes a radial wall 36 and an inner cylindrical wall 38 commonly referred to as a centerpost, the latter immediately surrounding the shaft 12. The forward rim of the wall 34 extends radially outwardly as at 40 to limit the extent of reception of the retainer within the recess 30 and this radially outwardly extending portion is reversed upon itself as at 42 for a purpose that will be set forth presently.

Disposed substantially well within the confines of the retainer 32 is a diaphragm or bellows member 44 which may be formed of a material which possesses both flexibility and resilience. The member 44 includes a cylindrical portion or section 50 the rear end of which is reversed upon itself throughout an angle of 180° to provide a sharp reverse bend 52, thus providing an outer cylindrical portion or section 54 which terminates in a radial flange 56, the latter being clamped between the inturned flange 42 and the outwardly turned portion 40 of the retainer 32. The washer 26 is provided with an outer cylindrical surface 58 against which the cylindrical portion 50 of the diaphragm 44 bears. The forward portion of the washer 26 is provided with a recess 60 defining a forwardly facing shoulder 62 and the forward end of the cylindrical portion 50 of the diaphragm 44 is turned inwardly as at 64 so as to bear against the shoulder 62. The diaphragm 44 is clamped against the washer 26 in sealing relationship with respect thereto by means of a metal ferrule 66 which is generally L-shaped in cross section and which fits tightly over the forward end of the diaphragm 44 and serves to compress the same against both the cylindrical surface 58 and the shoulder 62. From the above description it will be seen that the washer 26 is sealingly connected to the casing 16 by means of the diaphragm member 44 and retainer 32 in a manner that will become clear when the operation of the seal is described.

The washer 26 is normally urged in an axial direction along the shaft 12 by means of a compression spring 70 which surrounds the centerpost 38 and which bears at one end as at 72 against the wall 36 and at its other end as at 74 against a rearwardly facing shoulder 76 provided on the washer 26 by virtue of an undercut recess 78 provided in the rear side of the washer. The washer 26 is restrained against rotation relative to the remainder of the seal assembly 10 by means of two or more driving lugs 80 formed on the centerpost 38 and which lugs operate in axially extending slots 82 formed internally of the washer 26. Sufficient clearance is provided between the lugs 80 and slots 82 to permit free axial movement of the washer 26 along the centerpost 38.

As stated above, the diaphragm member 44 is formed of a material which possesses both flexibility and resilience and among the materials contemplated for its formation are rubber, either artificial or natural, or a rubber substitute, rubber impregnated cloth, nylon or "Teflon," the latter being the trade name of a polytetrafluoroethylene polymer manufactured and sold by E. I. du Pont de Nemours & Co. Various processes may be employed for manufacturing the diaphragm member 44 and where the latter is formed of rubber it may be formed by a compression molding operation. In the case of a rubber cloth the diaphragm may effectively be manufactured by the compression molding of a preformed article. In the case of nylon, the diaphragm may be most economically manufactured by an injection molding process and where Teflon is concerned, a cold compressing operation will be found suitable.

When the seal 10 is in its normal state before it is placed in service, the spring 70 and diaphragm 44 are in an unstressed condiiton and the overall axial dimension of the diaphragm will be somewhat greater than it will be when the seal is placed in an installation. This is because the spring 70 is in an unstressed condition and the machined parts are so designed that when the seal is assembled within the casing 16 and against the impeller, the latter presses the washer 26 rearwardly with respect to the retainer 32 and against the yielding action of the spring 70 so that the overall length of the seal 10 is shortened, thereby placing a stress on the spring 70, the reaction of which serves to force the washer 26 forwardly and maintain the sealing surfaces 20 and 22 in running sealing engagement. As the running surface 22 at the forward end of the nose piece 24 of the washer 26 becomes worn in use, any lost motion between the seal surfaces is taken up by the compressing action of the spring 70 so that the washer 26 shifts its position forwardly during such wear. At the same time, the diaphragm 44 at the region of the reverse bend 52 will roll in so to speak forwardly on the cylindrical section 58 of the washer 26 to compensate for the wear so that the effective length of the seal will not be altered. In cases where the radial running seal surfaces 20 and 22 are not truly radial or where they become sligthly misaligned there may be a tendency for the washer 26 to reciprocate axially along the centerpost 38 and in such instances a rolling action at the reverse bend 52 will take place during which time increments of either the outer cylindrical section 54 or the inner cylindrical section 50 of the diaphragm will be fed through the reverse bend 52 to the other cylindrical section.

By such an arrangement an extremely flexible diaphragm is provided in which there is no tendency for axial thrust in the resilient material of the diaphragm to retard the forward motion of the washer 26. Since the reverse bend 52 in the diaphragm is contained substantially wholly between the outer cylindrical surface 58 and the inner cylindrical surface of the cylindrical wall 34 of the retainer 32, an extremely short seal may be constructed in which provision is made for large displacements of the washer. Such a seal is particularly well adapted for use where there is a tendency for the washer 26 to reciprocate which is frequently the case where the running sealing surfaces are not truly radial. In such instances there is a tendency for wobbling of the parts and a normal amount of reciprocation of the washer 26 which would destroy the effectiveness of ordinary diaphragm or bellows constructions may be tolerated by the present seal. Additionally, the present seal construction is capable of installation in pumps and other constructions which may vary widely in the length of the space which is allotted for installation of the seal.

Figure 3:
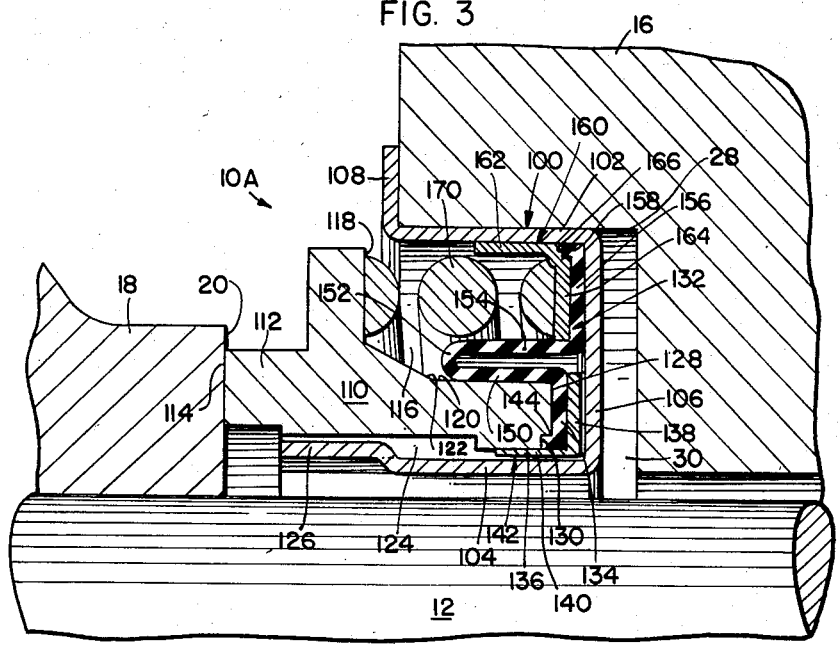
Fig. 3 is a sectional view similar to Fig. 1 showing a modified form of the invention.

In the form of the invention shown in Fig. 3 a somewhat modified form of seal assembly 10A has been shown but the essential features of the invention as displayed by the form of the invention shown in Fig. 1 have been preserved. This form of the invention has been illustrated in the same general surroundings including the shaft 12, impeller 18, and casing 16 which remain unchanged. In this form of the invention the shape of the various coperating seal parts has been altered somewhat to produce a seal assembly which differs noticeably in its appearance from the seal assembly in Fig. 1, but in which the same principle of operation remains. The retainer or shell 100 includes an outer cylindrical wall 102 and an inner cylindrical wall or centerpost 104, the two walls being interconnected by a rear radial wall 106. The forward rim of the wall 102 is turned laterally as at 108 to limit the extent of the pressed fit of the shell 100 within the recess 30 provided by the counterbore 28. The washer 110 is formed with the usual nose piece 112 having a flat radial sealing surface 114 designed for running sealing engagement with the sealing surface 20 on the impeller 18. The washer 110 is provided with an enlarged cutaway portion or recess 116 in its rear side providing a radial shoulder 118, a cylindrical surface 120 and an interconnecting inclined surface 122. The washer 110 and retainer 100 are provided with interengaging recesses and lugs 124 and 126 respectively which are similar to the recesses and lugs 82, 80 of the form of the invention shown in Fig. 1.

The rear face 128 of the washer 110 is provided with an undercut recess 130 and a diaphragm member 132 which may be formed of any of the materials suggested for the diaphragm member 44 is formed with an inner radial flange 134 which is clamped against the surface 128 by means of a ferrule 136 of L-shaped cross section, the radial wall 138 of which bears against the flange 134 and the cylindrical wall 140 of which is pressed into the central recess 142 provided in the washer 110. The flange 134 of the diaphragm 132 is formed with a laterally turned flange 144 which extends into the undercut recess 130 and which exists under compression therein by virtue of the ferrule 136.

The diaphragm 132 is formed with an inner cylindrical section 150 which hugs the cylindrical surface 120 of the washer and which terminates in a reverse bend 152 providing an outer cylindrical section 154 which is slightly spaced from the section 150. The outer cylindrical wall 154 merges with an outwardly extending radial flange 156 having a laterally turned peripheral flange 158. The flange 156 is adapted to be firmly clamped against the rear wall 106 of the retainer 100 by means of a clamping ferrule 160 having a horizontal flange portion 162 which is pressed within the cylindrical wall 102 of the retainer and also having a radially extending flange 164 bearing against the flange 156 of the diaphragm. A recess 166 formed in the ferrule 160 accommodates reception of the flange 158 on the periphery of the diaphragm. A coil spring 170 has its ends interposed between the rearwardly facing shoulder 118 on the washer and the forwardly facing surface of the radial flange 164 provided on the ferrule 160 serves to normally urge the washer 110 forwardly in the seal assembly.

The principle of operation of the seal assembly 10A in Fig. 3 is substantially the same as that of the seal assembly 10 shown in Fig. 1 and, as the washer 110 moves longitudinally on the shaft 12 either due to wear of the running seal surface 114 or due to reciprocation of the washer 110 under conditions of slight misalignment of the seal surfaces, the reverse bend 152 provided in the diaphragm 132 will roll on the cylindrical surface 124 of the washer and the effective longitudinal extent of the diaphragm will increase as the washer moves forwardly and decrease as the washer moves rearwardly due to the shifting of increments from one cylindrical section to the other and vice versa. The ferrule 136 and inner end or flange portion of the diaphragm will move in unison with the washer while the outer end or flange portion 156 of the diaphragm will, of course, remain firmly clamped against the rear radial wall 106 of the retainer 100. The interlocking ribs 126 provided on the centerpost 104 and the recess 124 provided interiorly of the washer 110 relieve the flexible diaphragm 132 from stress and prevent twisting or excessive distortion of the same.

Figure 4:
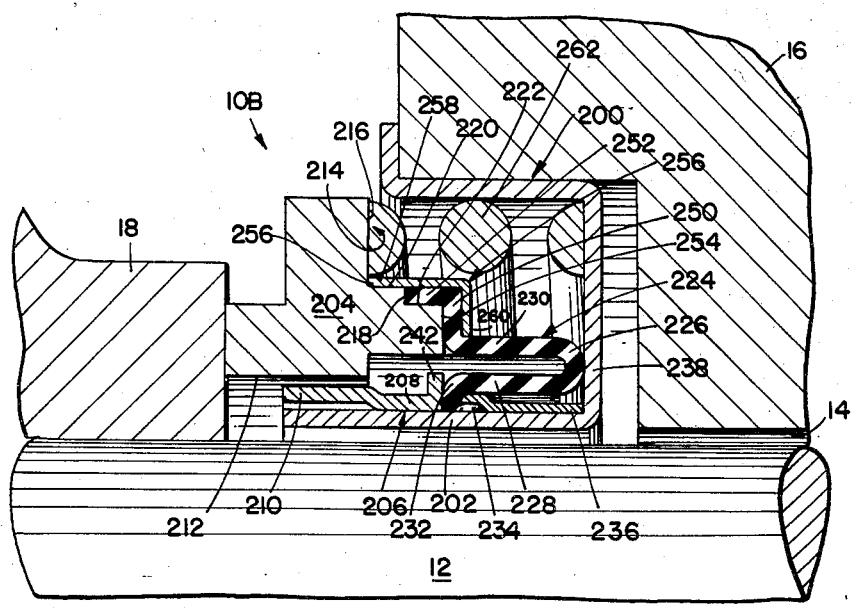
Fig. 4 is a sectional view similar to Figs. 1 and 3 showing a further modified form of the invention.

In Fig. 4 a still further modified form of seal assembly has been illustrated. As in the case of the form shown in Fig. 3, the assembly 10B is shown as being installed in the same pump environment including the shaft 12, impeller 18 and casing 16. The seal retainer or shell 200 is similar to the retainer 100 but the centerpost 202 thereof is cylindrical throughout and interlocking driving connection between the centerpost 202 and washer 204 is obtained by means of a sleeve 206 having a cylindrical portion 208 which is pressed upon the centerpost 202 and having driving lugs 210 which cooperate with registering notches 212 formed internally of the washer 204. The washer is formed with a recess 214 in its rear face presenting two rearwardly facing shoulders 216 and 218 together with two cylindrical surfaces 220 and 222 respectively. The diaphragm is designated in its entirety at 224 and is provided with a reverse bend 226 establishing inner and outer cylindrical sections 228 and 230 respectively. The section 228 is provided with a reverse bend 232 providing a rearwardly extending lip 234 which is preloaded upon the centerpost 202 by means of a sleeve 236 which surrounds the centerpost and bears at one end against the radial wall 238 of the retainer and which is formed at its other end with an offset portion 240 surrounding the lip 234. The forward rim of the sleeve 206 is turned radially outwardly as at 242 and bears forwardly against the reverse bend 232 provided in the diaphragm 224 so as to firmly clamp this portion of the diaphragm against the forward rim or offset portion of the sleeve 236.

The cylindrical wall 230 of the diaphragm 224 is turned radially outwardly as at 250 and again forwardly as at 252 with the portion 250 bearing against the extreme rear face 254 of the washer and with the portion 200 being preloaded inwardly against the cylindrical surface 222 by means of a ferrule 256 which is L-shaped in cross section and which has a cylindrical wall 258 pressed on the cylindrical surface 220 of the washer and a radial portion 260 which serves to clamp the section 250 of the diaphragm against the rear surface 254 of the washer. The spring 262 is substantially the same as in the other forms of the invention and bears at its forward end against the rearwardly facing shoulder 216 of the washer and at its rear end directly against the rear wall 238 of the retainer.

The operation of the seal assembly 10B in Fig. 4 is similar to that of the other forms of seal assemblies previously described. When the washer 204 moves forwardly along the shaft 12 the reverse bend 226 provided in the diaphragm 224 will roll forwardly on the sleeve 236 and the effective longitudinal extent of the diaphragm will be decreased. In the drawing the washer 204 is shown in its fully retracted position so that the reverse bend 226 bears against the inner surface of the radial wall 238 of the retainer 200. However, after an appreciable amount of wear has taken place at the running seal surfaces, the washer 204 will have moved forwardly under the influence of the spring 262 and thereafter any rearward movement of the washer occasioned by reciprocation thereof will cause the reverse bend 226 to roll rearwardly on the sleeve 236 thus increasing the longitudinal span of the diaphragm 224. In this form of the invention the opposite peripheral edges of the diaphragm 224 are firmly and sealingly secured to the retainer 200 and washer 204 respectively. The inner edge region of the diaphragm is maintained against pulling away from the retainer 200 by the clamping action which exists between the two sleeves 206 and 236 both of which are pressed on the centerpost 202 and which firmly engage the material of the bellows therebetween. In the case of the outer periphery of the diaphragm 224 the longitudinal and radial spans 258 and 260 of the ferrule 256 firmly and sealingly clamp the material of the diaphragm against the surface 220 and 254 of the washer.

From the above description it will be seen that the present invention effectively accomplishes the various objects previously set forth and by the accomplishment of these objects there has been provided a simple, effective and economically feasible rotary seal. The invention is capable of considerable modification and the design of the seal may be modified and the invention otherwise utilized in various ways other than those illustrated and described herein without departing from the spirit of the invention as set forth in the accompanying claims.

What I claim is:

1. In an end face seal of the tubular diaphragm type designed for use in sealing the space existing between two relatively rotatable elements, in combination, a sealing washer having a substantially flat radial sealing surface designed for running sealing engagement with a radial surface which is fixed relative to one of said rotatable elements and having axially spaced rearwardly facing surfaces and a cylindrical surface adjacent one of the rearwardly facing surfaces, a yieldable coil spring normally urging said washer in an axial direction forwardly against one of said radial surfaces, and means for sealing said washer to the other element while permitting a limited amount of axial movement of the washer relative to said latter element, said sealing means comprising a tubular diaphragm of flexible resilient material having a radial flange at its outer peripheral region and a radial flange at its inner peripheral region, one of said flanges terminating in a laterally extending cylindrical extension, a cup-shaped ferrule encompassing said latter flange and extension and serving to preload the same in sealing engagement against the other of said rearwardly facing surface and the aforesaid cylindrical surface of the washer respectively, means for clamping the other diaphragm flange to said other element in sealing relationship, said diaphragm further including two concentric cylindrical sections of different radial diameters one within the other and having one pair of adjacent ends thereof connected to the two said flanges respectively and having the other pair of adjacent ends connected together by a 180° reverse bend through which increments of one cylindrical section are fed into the other cylindrical section by a rolling action of the material of the reverse bend during axial shifting of the washer relative to said latter element in either direction.

2. In an end face seal of the tubular diaphragm type, the combination set forth in claim 1 wherein said washer is formed with a second cylindrical surface in the outer peripheral regions thereof and in which said two concentric cylindrical sections of the diaphragm are concentric width and surround said second cylindrical surface of the washer and in which the inner cylindrical section of the diaphgragm is contiguous to said second cylindrical surface of the washer throughout its entire length.

3. In an end face seal of the tubular diaphragm type designed for use in sealing the space existing between a casing and a shaft which projects through said casing and which is rotatable relative thereto, in combination, a rigid metal mounting retainer having an outer cylindrical wall adapted for press fit with a cylindrical surface of said casing, an inner cylindrical centerpost through which the shaft extends, and an interconnecting radial wall, a sealing washer slidably disposed on said centerpost and having a radial sealing surface designed for running sealing engagement with a radial surface fixed relative to the shaft, a coil spring interposed between said washer and radial wall of the retainer normally urging said washer in a forward direction away from said radial wall to urge said washer axially against said radial surface, and means for sealing said washer to said retainer while permitting a limited amount of axial movement of the washer relative to the latter, said sealing means comprising a tubular diaphragm of flexible resilient material having inner and outer radially extending peripheral regions, means clamping the inner radial peripheral region of the diaphragm to the washer in sealing relationship with respect thereto, the outer radial peripheral region of the diaphragm extending between an end of said spring and said radial wall of the retainer whereby the latter region of the diaphragm is sealingly clamped to the retainer, said diaphragm further including two concentric cylindrical sections of different radial diameters, one within the other and both within the confines of the cylindrical wall of the retainer, said cylindrical sections having one pair of adjacent ends connected to the peripheral regions of the diaphragm and having the other pair of adjacent ends connected together by a 180° reverse bend through which increments of one cylindrical section are fed into the other cylindrical section by a rolling action of the material of the reverse bend during axial shifting of the washer relative to said latter element in either direction.

4. In an end face seal of the tubular diaphragm type, the combination set forth in claim 3 wherein said cylindrical sections of the diaphragm lie substantially wholly within the space existing between the outer surface of said washer and the surrounding outer cylindrical wall of the retainer.

5. In an end face seal of the tubular diaphragm type, the combination set forth in claim 4 including interengaging means on said centerpost and washer for preventing rotation of the washer relative to said centerpost.

References Cited in the file of this patent

UNITED STATES PATENTS

| | | |
|---|---|---|
| 2,650,841 | Meyer | Sept. 1, 1953 |
| 2,729,475 | Chambers et al. | Jan. 3, 1956 |

UNITED STATES PATENT OFFICE
CERTIFICATE OF CORRECTION

Patent No. 2,892,642                      June 30, 1959

Frank E. Payne

It is hereby certified that error appears in the printed specification of the above numbered patent requiring correction and that the said Letters Patent should read as corrected below.

Column 2, line 44, for "entirely" read -- entirety --; column 4, line 22, for "sligthly" read -- slightly --; line 59, for "coperating" read -- cooperating --; column 6, line 60, for "efiective" read -- effective --; column 7, line 32, for "width" read -- with --; line 34, for "diaphgragm" read -- diaphragm --.

Signed and sealed this 19th day of January 1960.

(SEAL)

Attest:

KARL H. AXLINE
Attesting Officer

ROBERT C. WATSON
Commissioner of Patents